UNITED STATES PATENT OFFICE.

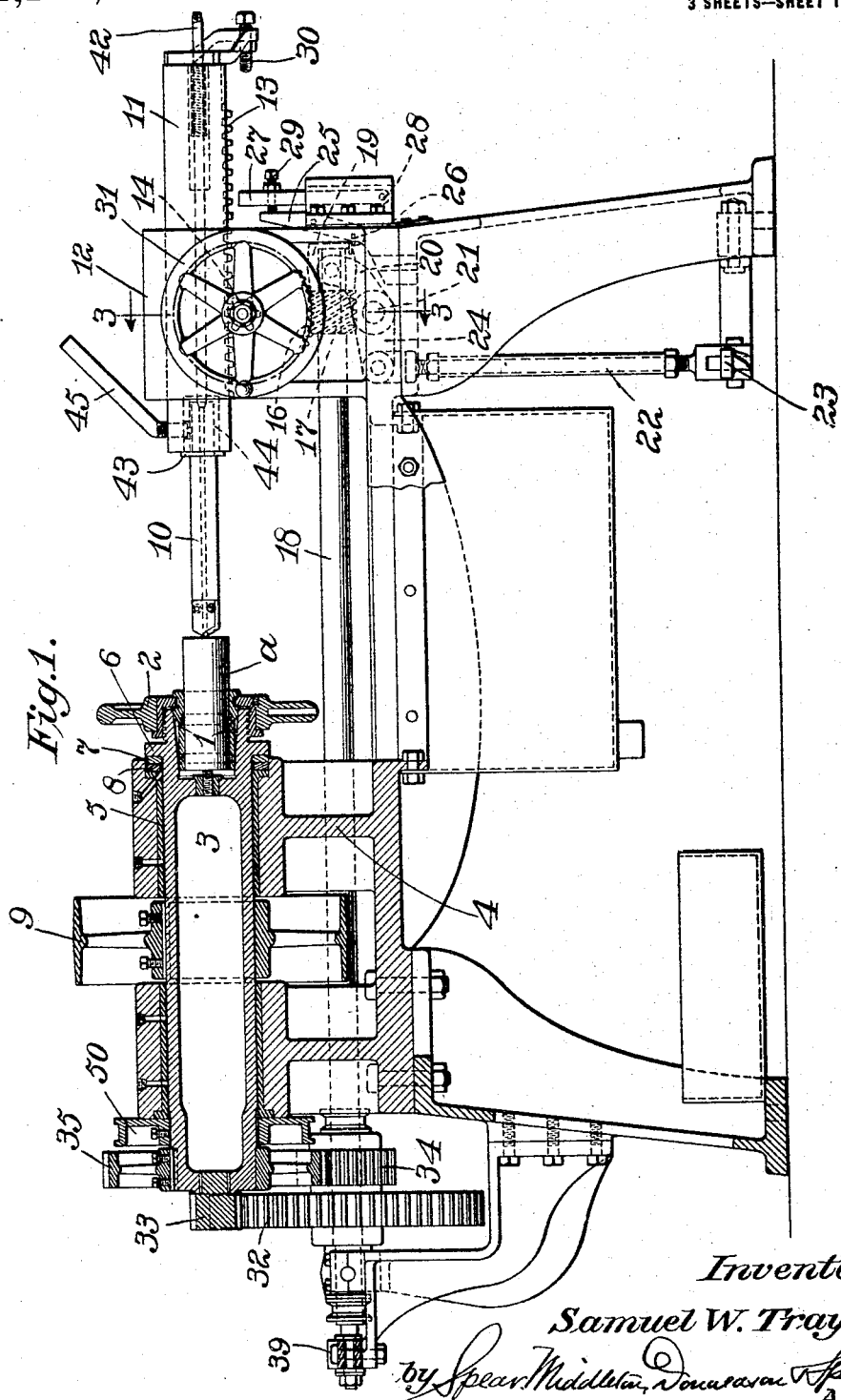

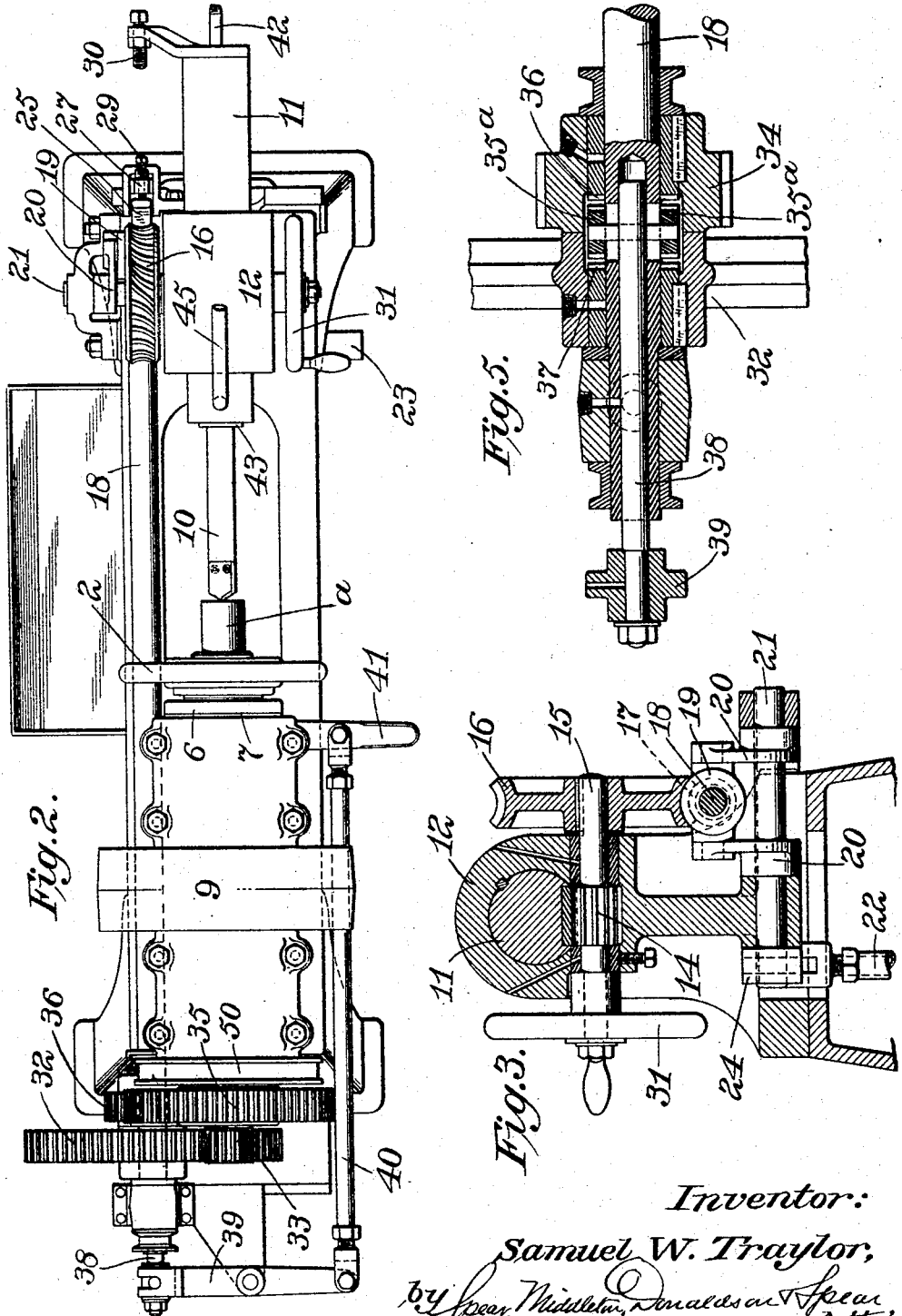
S. W. TRAYLOR.
DRILLING OR BORING MACHINE.
APPLICATION FILED DEC. 22, 1915.
1,198,973.
Patented Sept. 19, 1916.
3 SHEETS—SHEET 2.
Inventor:
Samuel W. Traylor,
by Spear, Middleton, Donaldson & Spear
Attys.

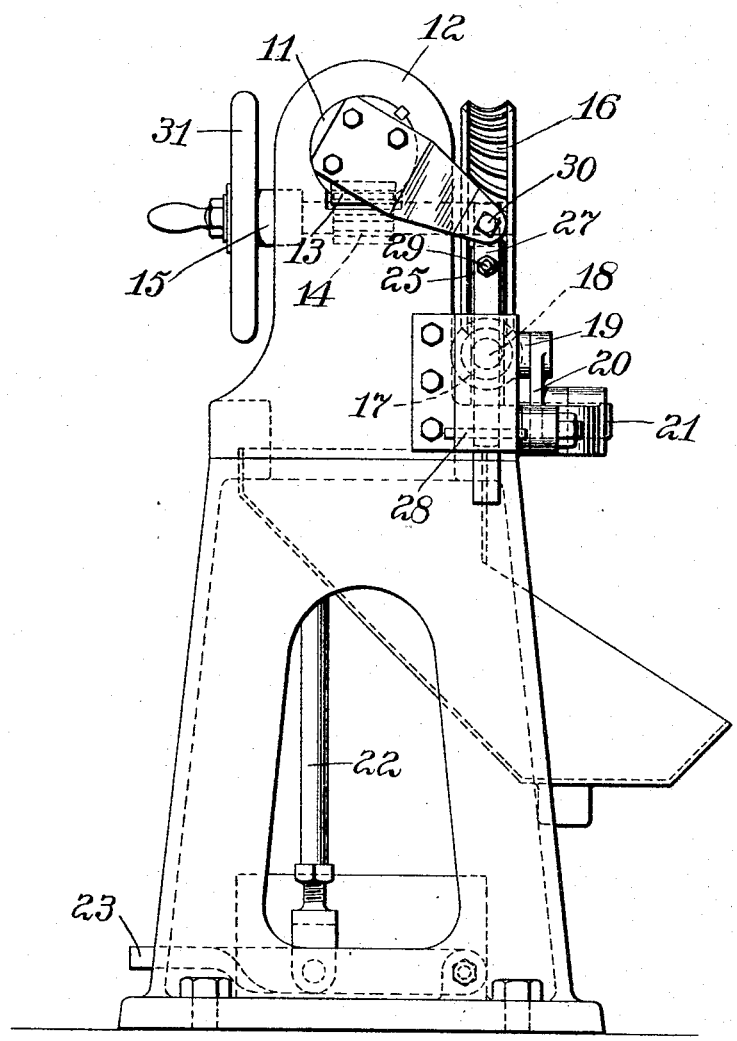

SAMUEL W. TRAYLOR, OF ALLENTOWN, PENNSYLVANIA.

DRILLING OR BORING MACHINE.

1,198,973.   Specification of Letters Patent.   Patented Sept. 19, 1916.

Application filed December 22, 1915. Serial No. 68,228.

*To all whom it may concern:*

Be it known that I, SAMUEL W. TRAYLOR, citizen of the United States, residing at Allentown, Pennsylvania, have invented certain new and useful Improvements in Drilling or Boring Machines, of which the following is a specification.

My invetnion is an improvement in horizontal drilling reaming or boring machines, and consists in the features and combination and arrangement of parts hereinafter described and particularly defined by the appended claims.

In the accompanying drawings Figure 1 is a part side elevation and part sectional view of the improved machine; Fig. 2 is a plan view; Fig. 3 is a cross sectional view through the boring head and attached parts substantially on the line 3—3 of Fig. 1; Fig. 4 is an end view looking from the right of Fig. 1; Fig. 5 is a sectional view to show details of construction.

In these drawings, 1 indicates the jaws of the chuck for holding the work piece indicated at *a*, these chuck jaws being opened and closed by operating the hand wheel 2. The chuck jaws are carried by the spindle 3 which bears in the main frame 4, bronze sleeves 5 being interposed between the spindle and the frame bearings. The spindle has a flange 6 at its end bearing upon a bronze ring 7 which, in turn, bears upon a steel ring 8, the latter bearing upon the face of one of the sleeves or bushings 5. This ring construction provides a bearing for sustaining the end thrust of the chuck and its spindle under the boring or drilling operation. The spindle 3 is of hollow form and of considerable diameter, and it is rotated by the pulley 9. The boring bar 10 is mounted in the boring head 11 which is slidably mounted in the frame or bearing 12, the said boring bar having a rack 13 engaged by a pinion 14 on a shaft 15 which has fixed thereto the worm wheel 16 driven from a worm 17 on the feed shaft 18. This feed shaft bears in a collar 19 adjacent the worm 17, said collar being mounted on arms or levers 20, one at each side thereof, said levers being carried by a transverse shaft 21 mounted in the frame of the boring head, and said shaft is operated by a link 22 and treadle 23, the link, at its upper end, connecting with an arm 24 fixed to the shaft 21. The purpose of this mounting is to allow this end of the feed shaft 18 to have up and down movement so as to disengage the worm 17 from the worm wheel 16 at the end of the boring operation. For accomplishing this result automatically, the feed shaft is held in its elevated position with the worm in engagement with the worm wheel by a trip lever 25 pivoted in a bracket fixed to the frame, the lower end of said trip lever having a tooth at 26 engaging a corresponding tooth on the collar 19 or other suitable part mounted on the feed shaft. This trip lever is adapted to be operated by a contact lever 27 pivoted at 28 and having an adjustable screw 29 to engage the trip lever, the said contact lever being operated by a contact 30 adjustably mounted on the boring bar.

It will be seen from the above described construction that the trip mechanism and contacts can be set to stop the forward motion of the boring tool at various points in the stroke of the boring bar or head as may be desired to suit the work being done. This stopping operation is due to the contact 30 engaging the contact lever 27 which trips lever 25, and thus allows the feed shaft 18 to drop, and disengage the worm 17 from the worm wheel, which, of course, stops the rotation of the shaft 15 and of the pinion 14 which engages the rack on the boring bar. The trip lever also may be operated by hand in case the operator finds the drilling operation is not being performed properly. The operator may run the boring bar or head in either direction by operating the hand wheel 31 mounted on the shaft 15. When the automatic feed of the boring bar is to take place again, the operator, by depressing the treadle 23, can lift the feed shaft and engage the worm thereon with the worm wheel to thus start the feed in motion. The feed shaft may be driven at different speeds, for which purpose it is provided with a large gear wheel 32 meshing with a pinion 33 on the spindle of the chuck, and it is also provided with a pinion 34 meshing with a large gear 35 on the chuck spindle. Clutch mechanism is provided for connecting either the gear 32 or the pinion 34 to the feed shaft, this consisting, as shown in Fig. 5, of members 35ª adapted to engage jaws 36, 37, on the pinion and gear, respectively, the said jaw members 35ª being shifted by a rod 38 operated by a lever 39 and rod 40 from a pivoted handle 41, see Fig. 2.

In order to supply cutting compound to the tool, a pipe 42 is provided which is screwed into the end of the boring bar 10. This boring bar is held fast in a sleeve 43, and this sleeve is held, in turn, by a key 44. The boring bar has also a key at the bottom side thereof which fits into the bushing or sleeve 43, and in this way the boring bar is prevented from turning. At the top side of the boring bar a holding hand screw 45 is provided for the purpose of binding down on top of the boring bar to prevent it from being pulled out of place when the machine is reversed. The machine may be run either to advance the boring bar or retract it by suitably controlling the driving connection.

The tool which is used in this machine is of the form described in a separate specification, it having inclined front edges meeting at the axial center line of the tool, and inclined divergent side edges merging into parallel edges, the effect of which is to perform drilling, rough reaming and finishing reaming during one complete operation of the boring tool on the work piece.

At 50 is shown a combination collar and pulley. This prevents the chuck spindle from having undue play and this pulley may be used to drive a pump that furnishes the cutting compound to the drill.

I claim as my invention:—

1. In combination a frame, a chuck, a spindle carrying the chuck, means for driving the spindle, a boring head, a feed shaft for driving the boring head, and change speed connections from the spindle of the chuck to the feed shaft, substantially as described.

2. In combination a frame, a chuck spindle mounted in the frame between bearings, a pulley mounted on the chuck spindle between said bearings, a boring head, a feed shaft with connections to the boring head, a pinion and a gear on the chuck spindle, a gear and pinion on the feed shaft meshing with the pinion and gear on the spindle, and a clutch for fixing either the gear or the pinion to the feed shaft, substantially as described.

3. In combination a frame, a chuck spindle mounted in said frame, means for driving the chuck spindle, a boring head, a feed shaft with connections to the boring head, means for driving the feed shaft from the chuck spindle, said shaft having movement to disengage the connection between itself and the boring head, and means moving with the boring head for effecting said disengagement of the driving connections to the boring head, substantially as described.

4. In combination with a chuck, a boring head having reciprocatory movement horizontally, a feed shaft, a connection between the said feed shaft and the boring head for feeding the same in a direction substantially parallel with the axis of the feed shaft, said feed shaft being arranged horizontally, and being arranged to drop at one end to disengage the connection between itself and the boring head to arrest the advance of said head, and means for dropping said shaft to effect disengagement, said means being mounted on the boring head substantially as described.

5. In combination a frame, a chuck mounted therein, a boring head slidably mounted in the frame, a feed shaft substantially parallel with the slidable boring head, a worm thereon, a shaft extending transversely below the boring head, a pinion on said shaft, a worm gear engaging the said worm and mounted on said transverse shaft, a rack on the boring head engaging the said pinion, the said feed shaft being adapted to drop to remove the worm from the worm wheel, trip mechanism controlling the dropping of the feed shaft, said trip mechanism being controlled from the longitudinal movement of the boring head, and lever mechanism for restoring the feed shaft to reëngage its worm with the worm gear, substantially as described.

In testimony whereof I affix my signature in presence of two witnesses.

SAMUEL W. TRAYLOR.

Witnesses:
ELLA M. SNYDER,
F. A. CRISPEN.

Copies of this patent may be obtained for five cents each, by addressing the "Commissioner of Patents, Washington, D. C."